United States Patent
Zhou et al.

(10) Patent No.: US 8,147,567 B2
(45) Date of Patent: Apr. 3, 2012

(54) ENHANCED BIODIESEL FUEL HAVING IMPROVED LOW-TEMPERATURE PROPERTIES AND METHODS OF MAKING SAME

(75) Inventors: Guangci Zhou, El Cerrito, CA (US); Curt Munson, Oakland, CA (US); Saleh A. Elomari, Fairfield, CA (US); Stephen H. Roby, Hercules, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 13/098,886

(22) Filed: May 2, 2011

(65) Prior Publication Data

US 2011/0203165 A1 Aug. 25, 2011

Related U.S. Application Data

(62) Division of application No. 12/342,900, filed on Dec. 23, 2008, now Pat. No. 8,057,558.

(51) Int. Cl.
*C10L 1/18* (2006.01)

(52) U.S. Cl. .............. 44/308; 44/388; 44/398

(58) Field of Classification Search .......... 44/308, 44/388, 398
See application file for complete search history.

(56) References Cited

U.S. PATENT DOCUMENTS

| | | | |
|---|---|---|---|
| 5,578,090 A * | 11/1996 | Bradin | 44/308 |
| 7,544,645 B2 | 6/2009 | Miller et al. | |
| 7,931,703 B2 * | 4/2011 | Roby et al. | 44/307 |
| 8,057,558 B2 * | 11/2011 | Zhou et al. | 44/308 |
| 2004/0088909 A1 * | 5/2004 | Berglund | 44/398 |
| 2009/0198075 A1 | 8/2009 | Miller | |
| 2010/0077651 A1 | 4/2010 | Roby | |

FOREIGN PATENT DOCUMENTS

| | | |
|---|---|---|
| KR | 734201 | 7/2007 |
| KR | 734202 | 7/2007 |

OTHER PUBLICATIONS

R. Baum, "Microalgae are Possible Source of Biodiesel Fuel," Chem. & Eng. News, vol. 72(14), pp. 28-29, 1994.

Huber et al., "Synthesis of Transportation Fuels from Biomass: Chemistry, Catalysts, and Engineering," Chem. Rev., vol. 106, pp. 4044-4098, 2006.

Meher et al., "Technical aspects of biodiesel production by transesterification—a review," Renewable & Sustainable Energy Reviews, vol. 10, pp. 248-268, 2006.

Pearce, "Fuels Gold," New Scientist, Sep. 23, pp. 36-41, 2006.

Rana et al., "A Review of Recent Advances on Process Technologies for Upgrading of Heavy Oils and Residua," Fuel, vol. 86, pp. 1216-1231 (2007).

* cited by examiner

*Primary Examiner* — Cephia D Toomer
(74) *Attorney, Agent, or Firm* — Edward T. Mickelson

(57) ABSTRACT

The present invention is generally directed to novel biodiesel fuel compositions having enhanced low-temperature properties. The present invention is additionally directed to methods (i.e., processes) for making such enhanced biodiesel fuels by improving the low-temperature properties of ester-based biodiesel fuels via in situ enhancement and/or additive enhancement.

5 Claims, 3 Drawing Sheets

ENHANCED BIODIESEL FUEL HAVING IMPROVED LOW-TEMPERATURE PROPERTIES AND METHODS OF MAKING SAME

CROSS-REFERENCE TO RELATED APPLICATIONS

This application for patent is a Divisional of U.S. patent application Ser. No. 12/342,900, filed Dec. 23, 2008.

FIELD OF THE INVENTION

This invention relates generally to fuel compositions, and particularly to enhanced biodiesel fuel compositions comprising functionalized species derived from biodiesel, wherein such functionalized species can serve to improve the low-temperature properties of the biodiesel fuel compositions of which they are a component.

BACKGROUND

Biofuels are of increasing interest for a number of reasons including: (1) they are a renewable resource, (2) their production is less dependent on geopolitical considerations, (3) they provide the possibility of a direct replacement of petroleum-based fuels in existing vehicles, and (4) the net greenhouse gas emissions can be substantially reduced by virtue of $CO_2$ uptake by biofuel precursors—particularly in the case of cellulosic feedstocks. See Pearce, "Fuels Gold," New Scientist, 23 September, pp. 36-41, 2006.

An easily-obtainable biofuel is vegetable oil, which largely comprises triglycerides and some free fatty acids. The properties of vegetable oil, however, make it generally inappropriate for use as a direct replacement for petroleum diesel in vehicle engines, as the vegetable oils' viscosities are generally too high and do not burn cleanly enough, thereby leaving damaging carbon deposits on the engine. Additionally, vegetable oils tend to gel at lower temperatures, thereby hindering their use in colder climates. These problems are mitigated when the vegetable oils are blended with petroleum fuels, but still remain an impediment for long-term use in diesel engines. See Pearce, 2006; Huber et al., "Synthesis of Transportation Fuels from Biomass: Chemistry, Catalysts, and Engineering," Chem. Rev., vol. 106, pp. 4044-4098, 2006.

Transesterification is currently a method used to convert vegetable oils into diesel-compatible fuels (i.e., biodiesel) that can be burned in conventional diesel engines. When methanol is used to transesterify vegetable oil, the resulting biodiesel is primarily composed of methyl esters that have long straight chain aliphatic groups attached to a carbonyl group (i.e., fatty acid methyl esters, or FAME). Such biodiesel invariably comprises ester species having regions of unsaturation, i.e., double bonds, although the amount of such unsaturated ester species can vary widely depending upon its biomass source. See, e.g., Meher et al., "Technical aspects of biodiesel production by transesterification—a review," Renewable & Sustainable Energy Reviews, vol. 10, pp. 248-268, 2006. While such processing of vegetable oil enhances their ability to be used as fuels, the resulting ester-based compositions still have low-temperature properties that are generally inferior to those of conventional petroleum-based diesel.

Accordingly, compositions and/or methods for improving the low-temperature properties of biodiesel made by transesterification of vegetable oils would be quite useful, particularly wherein they impart the resulting fuel with greater seasonal and geographic utility.

BRIEF DESCRIPTION OF THE INVENTION

The present invention is generally directed to novel biodiesel fuel compositions having enhanced low-temperature properties. The present invention is additionally directed to methods (i.e., processes) for making such enhanced biodiesel fuels by improving the low-temperature properties of ester-based biodiesel fuels (vide supra) via in situ enhancement/modification and/or additive enhancement.

In some embodiments, the present invention is directed to one or more enhanced biodiesel fuel compositions, said compositions comprising: (a) an ester-based biodiesel component; and (b) a functionalized ester component comprising functionalized ester species having the general formula:

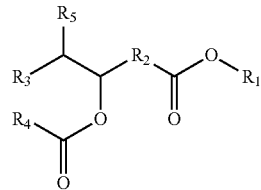

wherein $R_1$ is selected from the group consisting of C1 to C3 alkyl moieties; wherein $R_2$ and $R_3$ are independently selected from the group consisting of C1 to C10 alkyl moieties, C1 to C10 alkenyl moieties, and combinations thereof; wherein $R_4$ is selected from the group consisting of C2 to C20 alkyl moieties and C2 to C20 alkenyl moieties; wherein $R_5$ is selected from the group consisting of —H, hydroxyl (—OH), and C2 to C20 ester-forming carboxylate (RCOO—) functional species/moieties; and wherein the functionalized ester species amount to at least about 0.1 weight percent of the enhanced biodiesel fuel.

In some embodiments, the present invention is directed to one or more methods of a first type for improving low-temperature properties of biodiesel fuel, such methods comprising the steps of: (a) providing a biodiesel fuel comprising unsaturated ester molecules; (b) treating the biodiesel fuel so as to react at least some of the unsaturated ester molecules contained therein with an oxidizing species to convert at least some of the unsaturated ester molecules to epoxy-ester species and provide for an epoxy-ester-containing biodiesel fuel; and (c) reacting at least some of the epoxy-ester species in the epoxy-ester-containing biodiesel fuel with one or more reactants to produce an enhanced biodiesel fuel composition comprising functionalized ester species (vide supra), wherein such enhancement of the biodiesel fuel at least partially results from an improvement in the low-temperature properties of said enhanced biodiesel fuel relative to those of the biodiesel fuel from which it was derived.

In some embodiments, the present invention is directed to one or more methods of a second type for improving low-temperature properties of biodiesel fuel, such methods comprising the steps of: (a) providing a first biodiesel fuel comprising unsaturated ester molecules; (b) extracting at least some of the unsaturated ester molecules from the first biodiesel fuel so as to provide an extract; (c) treating the extract with an oxidizing species so as to convert at least some of the unsaturated ester molecules contained therein into epoxy-ester species and provide for an epoxy-ester-containing intermediate; (d) reacting at least some of the epoxy-ester species in the epoxy-ester-containing intermediate with one or more reactants to produce a functionalized ester composition comprising functionalized ester species; and (e) adding the functionalized ester composition to a second biodiesel fuel so as to provide for an enhanced biodiesel fuel.

The foregoing has outlined rather broadly the features of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

1. Introduction

Figure 1:
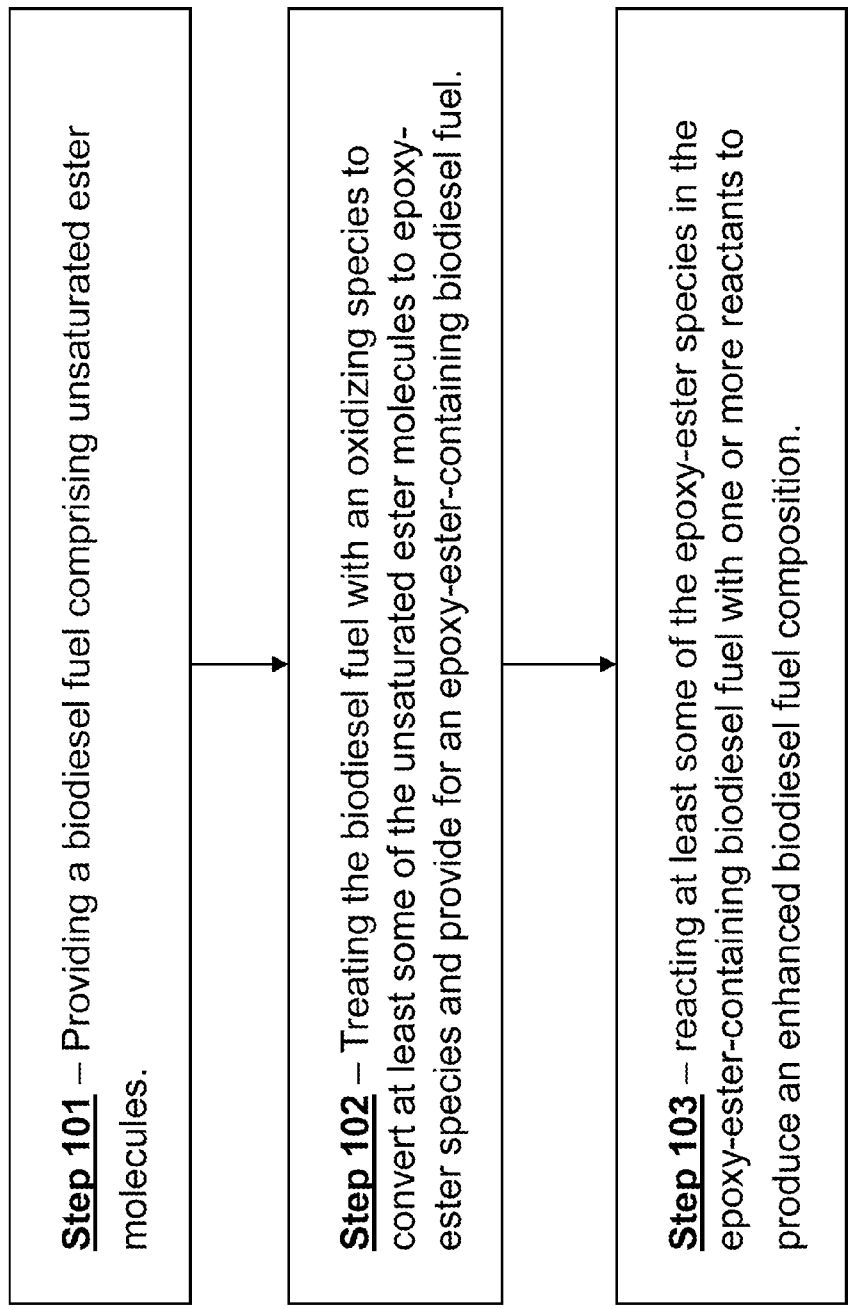
FIG. 1 illustrates, in stepwise fashion, a first type of method for generating an enhanced diesel fuel composition, in accordance with some embodiments of the present invention.

As mentioned above, embodiments of the present invention are generally directed to novel biodiesel fuel compositions having enhanced low-temperature properties, and to methods (i.e., processes) for making such compositions. Such novel biodiesel fuel compositions are generally lipid- or ester-based, but can also be the product(s) of blending with conventional diesel and/or other bio-derived fuels. Method of making such fuels involve the incorporation of low-temperature property-improving species in the fuel composition, wherein such species can be incorporated in the composition in situ and/or as an additive.

2. Definitions

Certain terms and phrases are defined throughout this description as they are first used, while certain other terms used in this description are defined below:

The prefix "bio," as used herein, refers to an association with a renewable resource of biological origin, such resources generally being exclusive of fossil fuels.

A "biologically-derived oil," as defined herein, refers to any triglyceride-containing oil that is at least partially derived from a biological source such as, but not limited to, crops, vegetables, microalgae, and the like. Such oils may further comprise free fatty acids. The biological source is henceforth referred to as "biomass." For more on the advantages of using microalgae as a source of triglycerides, see R. Baum, "Microalgae are Possible Source of Biodiesel Fuel," Chem. & Eng. News, vol. 72(14), pp. 28-29, 1994.

"Triglyceride," as defined herein, refers to class of molecules having the following molecular structure:

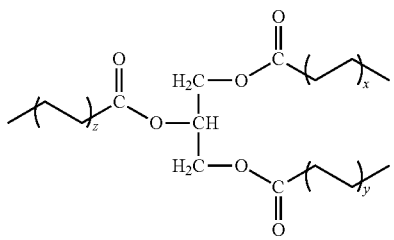

where x, y, and z can be the same or different, and wherein one or more of the branches defined by x, y, and z can have unsaturated regions.

A "carboxylic acid" or "fatty acid," as defined herein, is a class of organic acids having the general formula:

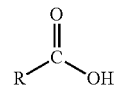

where "R" is generally a saturated (alkyl)hydrocarbon chain or a mono- or polyunsaturated (alkenyl)hydrocarbon chain.

"Lipids," as defined herein, broadly refers to the class of molecules comprising fatty acids, and tri-, di-, and monoglycerides.

"Hydrolysis" of triglycerides yields free fatty acids and glycerol, such fatty acid species also commonly referred to as carboxylic acids (see above).

"Transesterification," or simply "esterification," refers to the reaction between a fatty acid or ester (e.g., a triglyceride) and an alcohol to yield an ester species.

"Transportation fuels," as defined herein, refer to hydrocarbon-based fuels suitable for consumption by vehicles. Such fuels include, but are not limited to, diesel, gasoline, jet fuel and the like.

"Diesel fuel," as defined herein, is a material suitable for use in diesel engines and conforming to the current version of at least one of the following specifications: ASTM D 975—"Standard Specification for Diesel Fuel Oils"; European Grade CEN 90; Japanese Fuel Standards JIS K 2204; The United States National Conference on Weights and Measures (NCWM) 1997 guidelines for premium diesel fuel; and The United States Engine Manufacturers Association recommended guideline for premium diesel fuel (FQP-1A).

The term "biodiesel," as used herein, refers to diesel fuel that is at least significantly derived from a biological source, and which is generally consistent with ASTM International Standard Test Method D-6751. Often, biodiesel is blended with conventional petroleum diesel. B20 is a blend of 20 percent biodiesel with 80 percent conventional diesel. B100 denotes pure biodiesel.

An "enhanced biodiesel fuel," as defined herein, is a biodiesel fuel that has been modified so as to improve one or more properties relative to the unmodified fuel. Such modifications can be by way of in situ alterations of the fuel composition and/or by supplying additives to said composition.

"Cetane rating" or "cetane number," as defined herein, is a measure of combustion efficiency of a diesel fuel. Generally, the higher the cetane number, the more easily the fuel self-ignites under compression (as happens in a diesel engine). Additives are often added to increase a diesel fuel's cetane number. Note that pure cetane (hexadecane) has a cetane number (CN) of 100. See, e.g., ASTM International Standard Test Method D-613 for determining cetane number.

"Pour point," as defined herein, represents the lowest temperature at which a fluid will pour or flow. See, e.g., ASTM International Standard Test Methods D 5950-96, D 6892-03, and D 97.

"Cloud point," as defined herein, represents the temperature at which a fluid begins to phase separate due to crystal formation. See, e.g., ASTM Standard Test Methods D 5773-95, D 2500, D 5551, and D 5771.

As used herein, "carbon number" or "Cn," where "n" is an integer, describes a hydrocarbon or hydrocarbon-containing molecule or fragment (e.g., an alkyl or alkenyl group) wherein "n" denotes the number of carbon atoms in the fragment or molecule—irrespective of linearity or branching.

3. Fuel Compositions

As already mentioned, the novel biodiesel fuel compositions described herein generally comprise an ester-based biodiesel (fuel) component and a functionalized ester component, wherein the functionalized ester component comprises a quantity of functionalized ester-based species. The functionalized ester species, in the biodiesel fuel compositions of the present invention, provide improved low-temperature properties to the biodiesel fuels in which they reside, thereby rendering such fuels "enhanced."

In some embodiments, the present invention is directed to one or more enhanced biodiesel fuel compositions, said compositions comprising: (a) an ester-based biodiesel component; and (b) a functionalized ester component comprising functionalized ester species having the general formula:

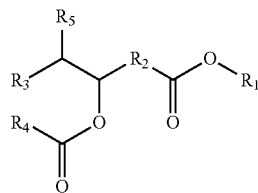

wherein $R_1$ is selected from the group consisting of C1 to C3 alkyl moieties; wherein $R_2$ and $R_3$ are independently selected from the group consisting of C1 to C10 alkyl moieties, C1 to C10 alkenyl moieties, and combinations thereof; wherein $R_4$ is selected from the group consisting of C2 to C20 alkyl moieties and C2 to C20 alkenyl moieties; wherein $R_5$ is selected from the group consisting of —H, hydroxyl (—OH), and C2 to C20 ester-forming carboxylate (RCOO—) functional species/moieties; and wherein the functionalized ester species amount to at least about 0.1 weight percent of the enhanced biodiesel fuel.

In some such above-described embodiments, the functionalized ester species function as pour point depressants. Operating in this manner, such species impart low-temperature property improvement to the fuel by lowering the temperature at which the fuel composition will continue to flow (vide supra).

In some such above-described embodiments, the enhanced biodiesel fuel composition has a pour point of less than about −5° C., in other embodiments it is less than −7° C., and in still other embodiments it is less than −9° C. Perhaps correspondingly, in some or other embodiments, the above-described enhanced biodiesel fuel composition has a cloud point of less than 7° C., in other embodiments it is less than 5° C., and in still other embodiments it is less than 4° C. Those of skill in the art will recognize that environmental, regional, and regulatory factors, as well as the fuel's intended use, may provide a need and/or desire for specific pour point and cloud point thresholds/limits.

In some such above-described embodiments, the enhanced biodiesel fuel composition further comprises epoxy-ester species, wherein such epoxy-ester species account for at least about 0.5 weight percent of the enhanced biodiesel fuel composition, and wherein such species function as combustion improvers in said enhanced biodiesel fuel composition. In some other embodiments, such epoxy-ester species account for at least about 2 weight percent of the enhanced biodiesel fuel composition. In still other embodiments, such epoxy-ester species account for at least about 5 weight percent of the enhanced biodiesel fuel composition.

In some such above-described embodiments (whether comprising epoxy-ester species or not), the enhanced biodiesel fuel composition has a cetane rating of at least about 40 and at most about 55. In other embodiments, the enhanced biodiesel fuel composition has a cetane rating of at least about 45. In still other embodiments, the enhanced biodiesel fuel composition has a cetane rating of at least about 50. While regulatory factors may require cetane numbers over 50, it is worth noting that cetane numbers greater than 55 often have little additional commercial value or benefit.

4. Methods of a First Type

As mentioned above, in some embodiments the present invention is directed to one or more methods of a first type for making such above-described enhanced fuel compositions and, by extension, to methods (also of a first type) for improving the low-temperature properties of a biodiesel fuel composition.

Referring to FIG. 1, in some embodiments, such above-described methods of a first type for improving low-temperature properties of biodiesel fuels comprise the steps of: (Step 101) providing a biodiesel fuel comprising unsaturated ester molecules; (Step 102) treating the biodiesel fuel so as to react at least some of the unsaturated ester molecules contained therein with an oxidizing species to convert at least some of the unsaturated ester molecules to epoxy-ester species and provide for an epoxy-ester-containing biodiesel fuel; and (Step 103) reacting at least some of the epoxy-ester species in the epoxy-ester-containing biodiesel fuel with one or more reactants to produce an enhanced biodiesel fuel composition comprising functionalized ester species, wherein such enhancement of the biodiesel fuel at least partially results from an improvement in the low-temperature properties of said enhanced biodiesel fuel relative to those of the biodiesel fuel from which it was derived.

Typically, the biodiesel fuel is at least partially-derived from a triglyceride-containing biomass from which an ester-based biodiesel fuel can be produced (vide supra). As mentioned above, fatty acid methyl esters (FAME) is a representative such biofuel. In some such above-described embodiments, the biodiesel fuel is B100. In some or other such embodiments, the biodiesel fuel is a mixture of biodiesel and conventional petroleum diesel. In still other such embodiments, the biodiesel fuel is a mixture of any combination of the following: ester-based biodiesel, non-ester-based biodiesel, and conventional petroleum diesel.

In some such above-described embodiments, the unsaturated ester molecules are present in the form of monounsaturated ester species, polyunsaturated ester species, and combinations thereof. In some such embodiments, the unsaturated ester molecules account for at least 1 weight percent of the biodiesel fuel. In other such embodiments, the unsaturated ester molecules account for at least 5 weight percent of the biodiesel fuel. In still other such embodiments, the unsaturated ester molecules account for at least 10 weight percent of the biodiesel fuel.

In some such above-described embodiments, the unsaturated ester molecules are selected from species having the general formula:

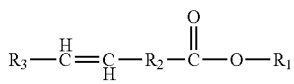

wherein $R_1$ is selected from the group consisting of C1 to C3 alkyl moieties; and wherein $R_2$ and $R_3$ are independently selected from the group consisting of C1 to C10 alkyl moieties, C1 to C10 alkenyl moieties, and combinations thereof.

In some such above-described embodiments, the oxidizing species is selected from the group consisting of hydrogen peroxide, organic peroxides, peroxy acids, and combinations thereof. An exemplary such organic peroxide is chloroperoxybenzoic acid, but those of skill in the art will recognize that the specific peroxide is not specifically so limited and that one or more of a variety of peroxide species could also be suitably so employed.

In some such above-described embodiments, the epoxy-ester-containing biodiesel fuel comprises a heterogeneous mixture of epoxy-ester species formed by the oxidation of a heterogeneous mixture of unsaturated ester molecules. Those of skill in the art will appreciate that such heterogeneity can result from heterogeneity in the biomass source(s) and/or a result of blending two or more different types of ester-containing biodiesel fuels.

In some such above-described embodiments, the step of reacting the epoxy-ester species comprises a reacting substep of epoxide ring opening to form a dihydroxy ester. In some such embodiments, the epoxide ring opening involves an acid-catalyzed hydrolysis. In some such embodiments, such methods further comprise a reacting substep of esterifying one or both hydroxyl groups of the dihydroxy ester species with an esterification species selected from the group consisting of carboxylic acids, acyl halides, acyl anhydrides, and combinations thereof. Examples of such ring opening and such subsequent esterification (if desired) is described in commonly-assigned U.S. patent application Ser. No. 11/696,564.

In some such above-described embodiments, the step of reacting the epoxy-ester species comprises a direct esterification of at least some of the epoxy-ester species. Examples of such direct esterification are given in commonly-assigned U.S. patent application Ser. No. 12/023,695.

In some such above-described embodiments, the functionalized ester species comprise the general formula:

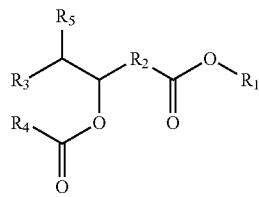

wherein $R_1$ is selected from the group consisting of C1 to C3 alkyl moieties; wherein $R_2$ and $R_3$ are independently selected from the group consisting of C1 to C10 alkyl moieties, C1 to C10 alkenyl moieties, and combinations thereof; wherein $R_4$ is selected from the group consisting of C2 to C20 alkyl moieties and C2 to C20 alkenyl moieties; and wherein $R_5$ is selected from the group consisting of —H, hydroxyl (—OH), and C2 to C20 ester-forming carboxylate (RCOO—) functional species/moieties.

Per the enhanced biodiesel fuels described above, in some embodiments the functionalized ester species amount to at least about 0.1 weight percent of the enhanced biodiesel fuel. Further, in some such embodiments the functionalized ester species function as pour point depressants in the enhanced biodiesel fuel.

Per the enhanced biodiesel fuels described above, in some such above-described embodiments, the enhanced biodiesel fuel has a pour point of less than about −5° C. In some such embodiments, the enhanced biodiesel fuel has a cloud point of less than about 7° C.

In some embodiments, the above-described enhanced biodiesel fuel comprises epoxy-ester species, wherein such epoxy-ester species comprise at least about 0.1 weight percent of the enhanced biodiesel fuel, and wherein such species function as combustion improvers in said enhanced biodiesel fuel. In some such embodiments, such epoxy-ester species comprise at most about 10 weight percent of the enhanced biodiesel fuel.

In some such aforementioned embodiments, the epoxy-ester species present in the enhanced biodiesel fuel are residual constituents, i.e., epoxy-ester species that were not reacted to yield functionalized ester species. In some or other such aforementioned embodiments, the epoxy-ester species present in the enhanced biodiesel fuel are supplied as additives, i.e., via a step of adding such species. Such epoxy-ester species can improve the overall combustion efficiency of the enhanced biodiesel fuel composition. See commonly-assigned U.S. patent application Ser. No. 12/241,411.

Regardless of whether of not epoxy-ester species are added to the fuel composition, in some such above-described embodiments, the enhanced biodiesel fuel has a cetane rating of at least about 40 and at most about 55.

5. Methods of a Second Type

As mentioned above, the present invention is also directed to one or more methods of a second type for making the enhanced biodiesel fuel compositions described above and, by extension, for improving the low-temperature properties of biodiesel fuel compositions.

Figure 2:
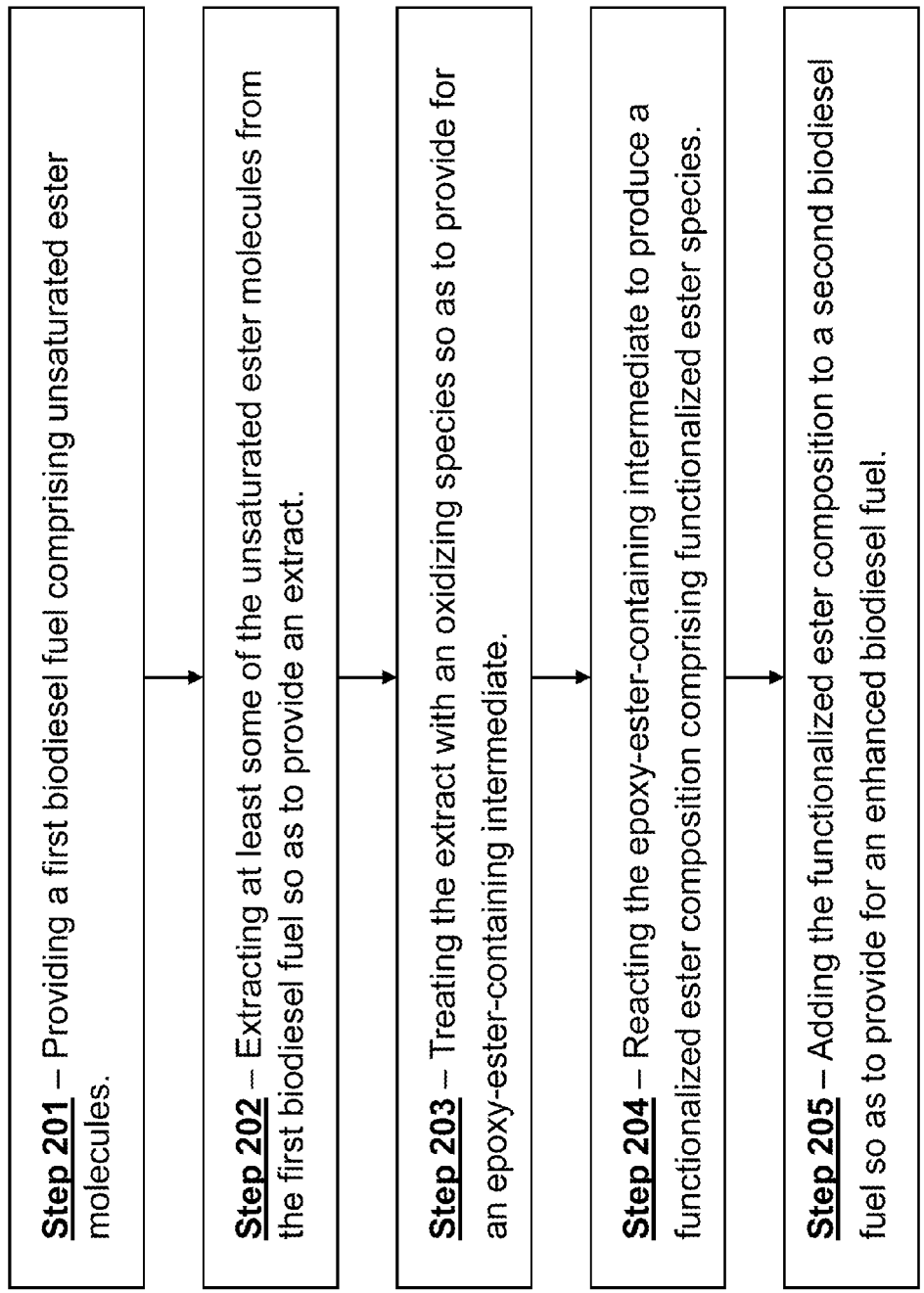
FIG. 2 illustrates, in stepwise fashion, a second type of method for generating an enhanced diesel fuel composition, in accordance with some embodiments of the present invention.

Referring to FIG. 2, in some embodiments, the present invention is directed to one or more methods of a second type for improving low-temperature properties of a biodiesel fuel, said method comprising the steps of: (Step 201) providing a first biodiesel fuel comprising unsaturated ester molecules; (Step 202) extracting at least some of the unsaturated ester molecules from the first biodiesel fuel so as to provide an extract; (Step 203) treating the extract with an oxidizing species so to convert at least some of the unsaturated ester molecules contained therein into epoxy-ester species and provide for an epoxy-ester-containing intermediate; (Step 204) reacting at least some of the epoxy-ester species in the epoxy-ester-containing intermediate with one or more reactants to produce a functionalized ester composition comprising functionalized ester species; and (Step 205) adding the functionalized ester composition to a second biodiesel fuel so as to provide for an enhanced biodiesel fuel.

In some such above-described embodiments, the first and second biodiesel fuels are at least substantially the same. In some or other such embodiments, the first and second biodiesel fuels are independently selected from B100 and one or more mixtures of biodiesel and conventional petroleum diesel.

In some such above-described embodiments, the step of extracting makes use of a technique selected from the group consisting of solvent dewaxing, fractional crystallization, and combinations thereof. Those of skill in the art will recognize that a number of other known separation techniques may also be suitably applicable for such extracting. Accordingly, extracting by any of such techniques should be considered to fall within the scope of the present invention.

In some such above-described embodiments, the unsaturated ester molecules are any combination of monounsaturated ester species and polyunsaturated ester species. Those of skill in the art will recognize that the characteristics and distribution of such species are highly dependent on the biodiesel fuel from which they are extracted.

In some such above-described embodiments, the unsaturated ester molecules are selected from species having the general formula:

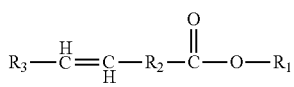

wherein $R_1$ is selected from the group consisting of C1 to C3 alkyl moieties; and wherein $R_2$ and $R_3$ are independently selected from the group consisting of C1 to C10 alkyl moieties, C1 to C10 alkenyl moieties, and combinations thereof.

In some such above-described embodiments, the oxidizing species is selected from the group consisting of hydrogen peroxide, organic peroxides, peroxy acids, and combinations thereof. An exemplary such oxidizing species is chloroperoxybenzoic acid (vide supra).

In some such above-described embodiments, the epoxy-ester-containing intermediate comprises a heterogeneous mixture of epoxy-ester species formed by the oxidation of a heterogeneous mixture of unsaturated ester molecules. Those of skill in the art will appreciate that such heterogeneity can result from heterogeneity in the biomass source(s) and/or a result of blending two or more different types of ester-containing biodiesel fuels.

In some such above-described embodiments, the step of reacting the epoxy-ester species comprises a reacting substep of epoxide ring opening to form a dihydroxy ester. In some such embodiments, the epoxide ring opening involves an acid-catalyzed hydrolysis. In some or other such embodiments, there further comprises a reacting substep of esterifying the dihydroxy ester species (one or both hydroxyl groups) with an esterification species selected from the group consisting of carboxylic acids, acyl halides, acyl anhydrides, and combinations thereof.

In some such above-described embodiments, the step of reacting the epoxy-ester species comprises a direct esterification of at least some of the epoxy-ester species. Such direct esterification of epoxy-ester species is described in commonly-assigned U.S. patent application Ser. No. 12/023,695.

In some such above-described embodiments, the functionalized ester species comprise the general formula:

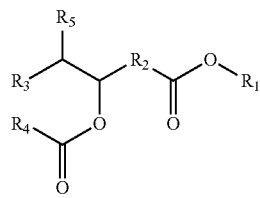

wherein $R_1$ is selected from the group consisting of C1 to C3 alkyl moieties; wherein $R_2$ and $R_3$ are independently selected from the group consisting of C1 to C10 alkyl moieties, C1 to C10 alkenyl moieties, and combinations thereof; wherein $R_4$ is selected from the group consisting of C2 to C20 alkyl moieties and C2 to C20 alkenyl moieties; and wherein $R_5$ is selected from the group consisting of —H, hydroxyl (—OH), and C2 to C20 ester-forming carboxylate (RCOO—) functional species/moieties. In some such embodiments, the enhanced biodiesel fuel comprises at least about 0.1 weight percent functionalized ester species. In some or other such embodiments, the functionalized ester species function as pour point depressants in the enhanced biodiesel fuel.

Per the enhanced biodiesel fuels described above, in some such above-described embodiments, the enhanced biodiesel fuel has a pour point of less than about −5° C. In some such embodiments, the enhanced biodiesel fuel has a cloud point of less than about 7° C.

In some embodiments, the above-described enhanced biodiesel fuel comprises epoxy-ester species, wherein such epoxy-ester species comprise at least about 0.1 weight percent of the enhanced biodiesel fuel, and wherein such species function as combustion improvers in said enhanced biodiesel fuel. In some such embodiments, such epoxy-ester species comprise at most about 10 weight percent of the enhanced biodiesel fuel.

In some such aforementioned embodiments, the epoxy-ester species present in the enhanced biodiesel fuel are residual constituents, i.e., epoxy-ester species that were not reacted to yield functionalized ester species. In some or other such aforementioned embodiments, the epoxy-ester species present in the enhanced biodiesel fuel are supplied as additives, i.e., via a step of adding such species. Such epoxy-ester species can improve the overall combustion efficiency of the enhanced biodiesel fuel composition. See commonly-assigned U.S. patent application Ser. No. 12/241,411.

Regardless of whether or not epoxy-ester species are added to the fuel composition, in some such above-described embodiments, the enhanced biodiesel fuel has a cetane rating of at least about 40 and at most about 55.

6. Variations

While the above-described embodiments have been directed to enhanced biodiesel fuel compositions and methods for improving the performance of biodiesel fuels, variations on such embodiments could extend to other wholly or partially bio-derived transportation fuels and/or heating fuels.

While the above-described embodiments have been largely directed to compositions and methods comprising ester-functionalized ester species (di- and tri-ester species), other functionalization routes are possible via the epoxy-ester species and/or some other intermediate. Additionally, the dihydroxy ester species mentioned above could also serve as a pour point depressant without further functionalization.

In some various embodiments, some or all of the ester-based biofuels are derived from animal fats, in addition to, or in lieu of, crop-based sources.

In some various embodiments, the present invention is directed to one or more methods of improving the low-temperature properties of one or more biofuels irrespective of the biofuel compositions that result from such methods.

7. EXAMPLES

The following examples are provided to demonstrate particular embodiments of the present invention. It should be appreciated by those of skill in the art that the methods disclosed in the examples which follow merely represent exemplary embodiments of the present invention. However, those of skill in the art should, in light of the present disclosure, appreciate that many changes can be made in the specific embodiments described and still obtain a like or similar result without departing from the spirit and scope of the present invention.

Example 1

This Example serves to illustrate a method of forming epoxy-ester species from biodiesel, in accordance with some embodiments of the present invention.

In this procedure, soy methyl ester (FAME derived from soybean oil) is used as the biodiesel/biofuel comprising unsaturated ester species to be epoxidized. The unsaturated ester species contained therein is oleic acid methyl ester (methyl oleate), $CH_3(CH_2)_7CH=CH(CH_2)_7COOCH_3$. The relative amounts can be determined by gas-chromatography/mass spectrometry (GC/MS) analysis.

Figure 3:
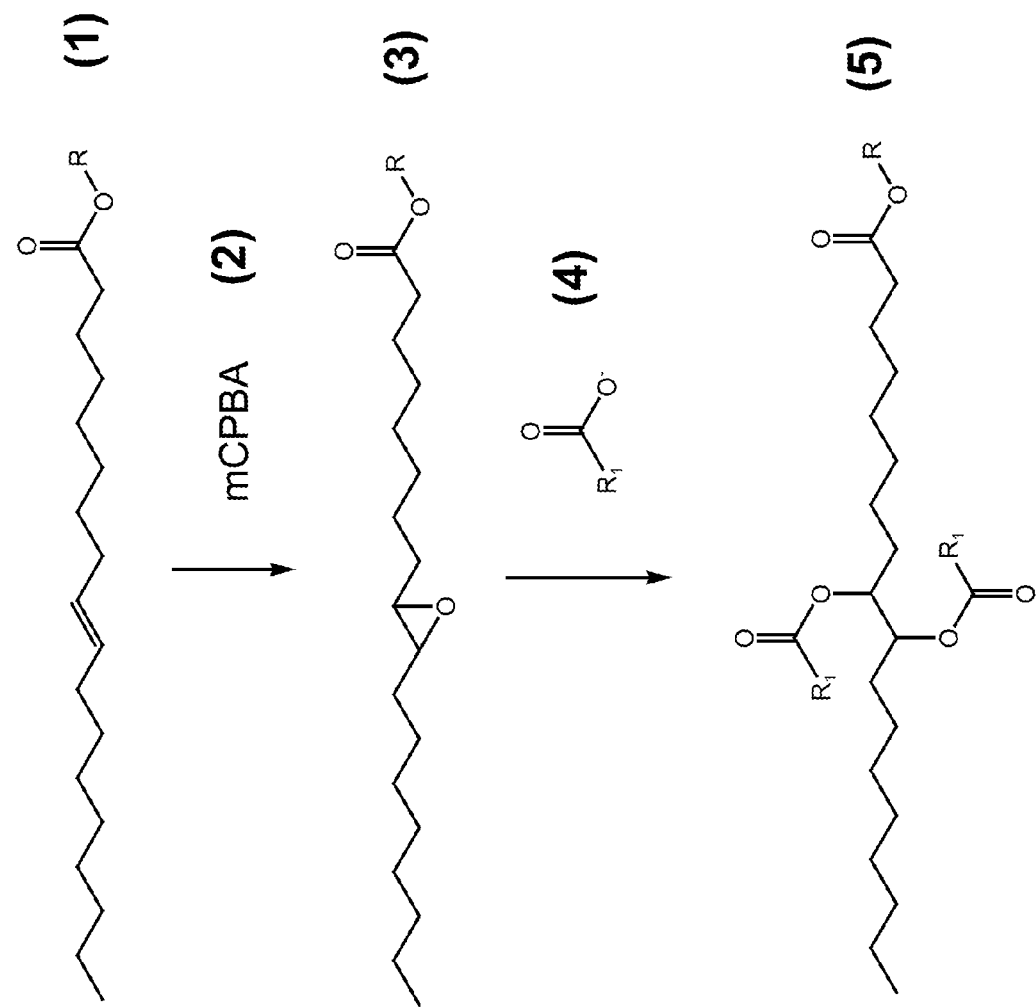
FIG. 3 depicts the formation of an epoxy-ester species, in accordance with some embodiments of the present invention.

With reference to FIG. 3, approx. 300 g of homogenized soy methyl ester (1) is weighed and transferred into a flask via a funnel. While stirring, 750 mL of methylene chloride ($CH_2Cl_2$) and 107 g of meta-chloroperoxybenzoic acid (2) (mCPBA, ~70-75%) ($ClC_6H_4COOOH$) is added to the flask (over a period of ~20 min.) which is subsequently stoppered. After suitable reaction time, the reaction mixture is filtered and the filtrate collected. Any visible water in the filtrate is removed with anhydrous $MgSO_4$, after which the filtrate is re-filtered.

The above-mentioned filtrate is transferred to a 2000 mL round bottom flask from which the methylene chloride is removed via rotary evaporation. Approx. 750 mL of hexanes are added to the residue with heating (~, 60° C.) until the residue is re-dissolved. The resulting solution is then transferred to a separatory funnel where it is washed twice with 750 mL of deionized (DI) water, twice with 700 mL of 10% potassium bicarbonate solution ($KHCO_3$), once (again) with 500 mL of DI water, and finally once with 700 mL of saturated sodium chloride solution (brine) to yield a washed organic phase. The washed organic phase is filtered with a D-glass Büchner frit, and the resulting filtrate is subjected to rotary evaporation to yield an oily product mixture comprising the epoxy-ester species (3) and palmitic methyl ester, wherein the epoxy-ester species has been determined to be present in an amount equal to about 70% of the product mixture, as determined by subsequent GC/MS analysis.

Example 2

This Example serves to illustrate conversion of epoxy-ester species to functionalized ester species, in accordance with some embodiments of the present invention.

Referring again to FIG. 3, the epoxy-ester species (3) generally provided for in EXAMPLE 1, is reacted with esterification agent (4) to yield functionalized ester species (5), wherein an exemplary esterification agent (4) is acetic anhydride, and wherein the functionalized ester species (5) can be a triester, a diester hydroxide, or a combination of the two.

To 200 mL of xylenes was added 82.6 g of propionic acid ($C_2H_5COOH$) and 100 g of soy-derived epoxy-ester species (3) with stirring and heated at reflux for 2 hours. Approx. 1.24 mL of phosphoric acid (85%) was then added. After 16 hours under reflux, the xylenes were removed via rotary evaporation. The remaining solution was washed 3× with 100 mL of 10% $NaHCO_3$ solution. The top (organic) layer was washed 3× with 250 mL of deionized water and then dried with anhydrous $MgSO_4$. The organic layer was then filtered and rotary-evaporated to yield a 67.2 g solution containing functionalized ester species (5).

Example 3

This Example serves to illustrate how methods/compositions of the present invention can be used to improve the low-temperature properties of biodiesel fuels, in accordance with some embodiments of the present invention.

A B10 soy-based FAME biodiesel was prepared having a pour point of −15° C. Adding 1 weight percent enhanced biodiesel soy-derived fuel composition (comprising ~29 weight percent functionalized ester species) reduced the pour point to −19° C.

8. Conclusion

The foregoing describes enhanced biodiesel fuel compositions having improved low-temperature properties. The present invention is additionally directed to methods for making such enhanced biodiesel fuels by improving the low-temperature properties of ester-based biodiesel fuels via in situ enhancement/modification and/or additive enhancement. Such compositions and methods extend the utility of ester-based biodiesel fuels to colder climates (geographically and seasonally).

All patents and publications referenced herein are hereby incorporated by reference to an extent not inconsistent herewith. It will be understood that certain of the above-described structures, functions, and operations of the above-described embodiments are not necessary to practice the present invention and are included in the description simply for completeness of an exemplary embodiment or embodiments. In addition, it will be understood that specific structures, functions, and operations set forth in the above-described referenced patents and publications can be practiced in conjunction with the present invention, but they are not essential to its practice. It is therefore to be understood that the invention may be practiced otherwise than as specifically described without actually departing from the spirit and scope of the present invention as defined by the appended claims.

What is claimed:

1. An enhanced biodiesel fuel composition comprising:
   a) an ester-based biodiesel component; and
   b) a functionalized ester component comprising functionalized ester species having the general formula:

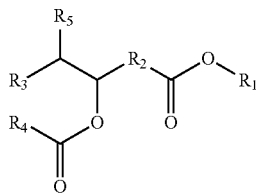

wherein $R_1$ is selected from the group consisting of C1 to C3 alkyl moieties; wherein $R_2$ and $R_3$ are independently selected from the group consisting of C1 to C10 alkyl moieties, C1 to C10 alkenyl moieties, and combinations thereof; wherein $R_4$ is selected from the group consisting of C2 to C20 alkyl moieties and C2 to C20 alkenyl moieties; wherein $R_5$ is selected from the group consisting of —H, hydroxyl, and C2 to C20 ester-forming carboxylate functional moieties; and wherein the functionalized ester species amount to at least about 0.1 weight percent of the enhanced biodiesel fuel.

2. The enhanced biodiesel fuel composition of claim 1, wherein said composition has a pour point of less than about −5° C.

3. The enhanced biodiesel fuel composition of claim 1, wherein said composition has a cloud point of less than about 7° C.

4. The enhanced biodiesel fuel composition of claim 1, further comprising epoxy-ester species, wherein such epoxy-ester species comprise at least about 0.1 weight percent of the enhanced biodiesel fuel composition, and wherein such species function as combustion improvers in said enhanced biodiesel fuel composition.

5. The enhanced biodiesel fuel composition of claim 4, wherein the enhanced biodiesel fuel composition has a cetane rating of at least about 40 and at most about 55.

* * * * *